US012749169B2

(12) United States Patent
Chen

(10) Patent No.: US 12,749,169 B2
(45) Date of Patent: Sep. 29, 2026

(54) MODEL TRAINING METHOD, VIDEO QUALITY ASSESSMENT METHOD AND APPARATUS, AND DEVICE AND MEDIUM

(71) Applicant: ZTE CORPORATION, Shenzhen (CN)

(72) Inventor: Junjiang Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 312 days.

(21) Appl. No.: 18/686,962

(22) PCT Filed: Sep. 1, 2022

(86) PCT No.: PCT/CN2022/116480
§ 371 (c)(1),
(2) Date: Feb. 27, 2024

(87) PCT Pub. No.: WO2023/036045
PCT Pub. Date: Mar. 16, 2023

(65) Prior Publication Data

US 2024/0370985 A1 Nov. 7, 2024

(30) Foreign Application Priority Data

Sep. 9, 2021 (CN) ......................... 202111055446.0

(51) Int. Cl.
*G06T 7/00* (2017.01)
*G06T 7/20* (2017.01)
*G06V 10/764* (2022.01)

(52) U.S. Cl.
CPC .............. *G06T 7/0002* (2013.01); *G06T 7/20* (2013.01); *G06V 10/764* (2022.01);
(Continued)

(58) Field of Classification Search
CPC ..................... G06T 7/0002; G06T 7/20; G06T 2207/10016; G06T 2207/20084; G06T 2207/30168; G06V 10/764
See application file for complete search history.

(56) References Cited

U.S. PATENT DOCUMENTS 8,660,372 B2 * 2/2014 Bovik .................... G06V 20/40
382/229
11,216,698 B2 * 1/2022 Colligan ............... G06T 7/0002
(Continued)

FOREIGN PATENT DOCUMENTS

CN 110599468 A * 12/2019 ........... G06T 7/0002
CN 110674925 A 1/2020
(Continued)

OTHER PUBLICATIONS

Xu et al., 2020, "C3DVQA: Full reference video quality assessment with 3D convolutional neural network" (pp. 1-5). (Year: 2020).*
(Continued)

*Primary Examiner* — Manav Seth
(74) *Attorney, Agent, or Firm* — Li & Cai Intellectual Property (USA) Office

(57) ABSTRACT

Provided in the present disclosure is a model training method for video quality assessment, including: acquiring training video data, where the training video data includes reference video data and distorted video data; determining a mean opinion score (MOS) of each piece of training video data; and training a preset initial video quality assessment model according to the training video data and the MOS thereof, until a convergence condition is met, so as to obtain a final video quality assessment model. Further provided in the present disclosure are a video quality assessment method and apparatus, a device and a medium.

15 Claims, 6 Drawing Sheets

(52) U.S. Cl.
CPC ............... *G06T 2207/10016* (2013.01); *G06T 2207/20084* (2013.01); *G06T 2207/30168* (2013.01)

(56) References Cited

U.S. PATENT DOCUMENTS

| | | | | |
|---|---|---|---|---|
| 2012/0269441 | A1* | 10/2012 | Marchesotti | G06F 18/253 382/195 |
| 2014/0354826 | A1* | 12/2014 | Kolarov | G06T 7/0002 348/175 |
| 2016/0358321 | A1* | 12/2016 | Xu | G06T 7/001 |
| 2019/0246112 | A1* | 8/2019 | Li | H04N 19/154 |
| 2019/0258902 | A1* | 8/2019 | Colligan | G06T 7/0002 |
| 2024/0046638 | A1* | 2/2024 | Zheng | G06V 10/454 |

FOREIGN PATENT DOCUMENTS

| | | | | | |
|---|---|---|---|---|---|
| CN | 110751649 | A | * | 2/2020 | G06T 7/0002 |
| CN | 110958467 | A | | 4/2020 | |
| CN | 111193923 | A | * | 5/2020 | H04N 21/64792 |
| CN | 111524110 | A | | 8/2020 | |
| CN | 113196761 | A | | 7/2021 | |
| CN | 114598864 | A | | 6/2022 | |
| JP | 2007306105 | A | | 11/2007 | |
| JP | 4408120 | B2 | * | 2/2010 | H04N 17/00 |
| JP | 2014130427 | A | | 7/2014 | |
| JP | 2020510463 | A | | 4/2020 | |
| JP | 2021504848 | A | | 2/2021 | |
| JP | 2021089730 | A | | 6/2021 | |
| KR | 102211556 | B1 | | 2/2021 | |
| KR | 20210037620 | A1 | | 4/2021 | |

OTHER PUBLICATIONS

Callet et al., 2006, "A convolutional Neural Network Approach for Objective Video Quality Assessment" (pp. 1316-1327). (Year: 2006).*
Japan Patent Office, the first Office Action dated Feb. 25, 2025, for corresponding JP application No. 2024-514541.
Sathya Veera Reddy Dendi et al. "Full-Reference Video Quality Assessment Using Deep 3D Convolutional Neural Networks," 2019 National Conference on Communications (NCC), IEEE dated Feb. 20, 2019 p. 1-5.
European Patent Office, the Extended European Search Report dated Nov. 19, 2024, for corresponding EP application No. 22866509.7.
Dendi Sathya Veera Reddy at al "Full reference video Quality Assessment Using Deep 3D Convolutional Neural Networks", 2019 National Conference On Communications (NCC), IEEE, Feb. 20, 2019.
MS Toshiko Tominaga NTT Japan "Performance comparisons of subjective quality assessment methods" , ITU-T Draft, Apr. 30, 2010.
China Patent Office, first Office action dated Jan. 4, 2025, for corresponding CN application No. 202111055446.0.
WIPO, International Search Report issued on Nov. 23, 2022.
Korean Patent Office, the first Office action dated Mar. 4, 2026, for corresponding KR application No. 10-2024-7009562.

* cited by examiner

MODEL TRAINING METHOD, VIDEO QUALITY ASSESSMENT METHOD AND APPARATUS, AND DEVICE AND MEDIUM

CROSS-REFERENCE TO RELATED APPLICATIONS

This application is a National Phase Application filed under 35 U.S.C. 371 as a national stage of PCT/CN2022/116480, filed on Sep. 1, 2022, an application claiming priority to Chinese patent application No. 202111055446.0 filed with the CNIPA on Sep. 9, 2021, the contents of which are incorporated herein by reference in their entirety.

TECHNICAL FIELD

The present application relates to, but is not limited to, the field of image processing technologies.

BACKGROUND

With the advent of the 5G era, video applications, such as live videos, short videos, video calls or the like, are becoming more and more popularized. In the internet era where everything goes to videos, the increasingly huge data traffic poses serious challenges to stability of the video service system. How to assess the video quality properly has become an important bottleneck restricting the development of various technologies, and it can even be said that video quality assessment has become the most fundamental and important issue in the audio and video field and needs to be solved urgently.

SUMMARY

The present disclosure provides a model training method for video quality assessment, a video quality assessment method, a model training apparatus for video quality assessment, a video quality assessment apparatus, an electronic device, and a computer storage medium.

In a first aspect, the present disclosure provides a model training method for video quality assessment, including: acquiring training video data, wherein the training video data includes reference video data and distorted video data; determining a mean opinion score (MOS) of each piece of training video data; and training a preset initial video quality assessment model according to the training video data and the MOS thereof, until a convergence condition is met, so as to obtain a final video quality assessment model.

In another aspect, the present disclosure further provides a video quality assessment method, including: processing video data to be assessed by the final video quality assessment model obtained by training in any method as described herein, to obtain a quality assessment score of the video data to be assessed.

In yet another aspect, the present disclosure further provides a model training apparatus for video quality assessment, including: an acquisition module configured to acquire training video data; wherein the training video data includes reference video data and distorted video data; a processing unit configured to determine a mean opinion score (MOS) of each piece of training video data; and a training module configured to train a preset initial video quality assessment model according to the training video data and the MOS thereof, until a convergence condition is met, so as to obtain a final video quality assessment model.

In another aspect, the present disclosure further provides a video quality assessment apparatus, including: an assessment module configured to process video data to be assessed by the final video quality assessment model obtained by training in the model training method for video quality assessment according to any method as described herein, to obtain a quality assessment score of the video data to be assessed.

In still another aspect, the present disclosure further provides an electronic device, including: one or more processors; and a storage device having one or more programs stored thereon which, when executed by the one or more processors, cause the one or more processors to implement any model training method for video quality assessment as described herein.

In yet another aspect, the present disclosure provides an electronic device, including: one or more processors; and a storage device having one or more programs stored thereon which, when executed by the one or more processors, cause the one or more processors to implement any video quality assessment method as described herein.

In yet another aspect, the present disclosure provides a computer storage medium storing a computer program thereon which, when executed by a processor, causes the processor to implement any model training method for video quality assessment as described herein.

In yet another aspect, the present disclosure provides a computer storage medium storing a computer program thereon which, when executed by a processor, causes the processor to implement any video quality assessment method as described herein.

DETAIL DESCRIPTION OF EMBODIMENTS

Figure 1:
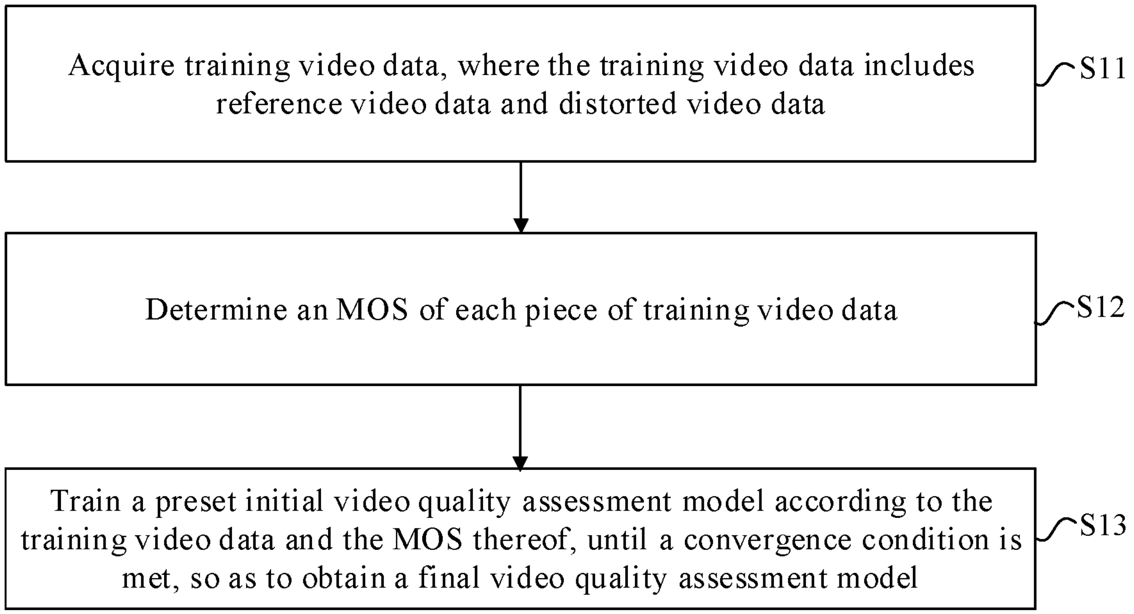
FIG. 1 is a schematic flowchart of a model training method for video quality assessment according to the present disclosure.

Example implementations will be described more sufficiently below with reference to the accompanying drawings, but which may be embodied in different forms and should not be construed as limited to the implementations set forth herein. Rather, these implementations are provided so that the present disclosure will be thorough and complete, and will fully convey the scope of the present disclosure to those skilled in the art.

As used herein, the term "and/or" includes any and all combinations of one or more of the associated listed items.

The terminology used herein is for the purpose of describing specific implementations only and is not intended to limit the present disclosure. As used herein, the singular forms "a", "an" and "the" are intended to include the plural forms as well, unless the context clearly indicates otherwise. It will be further understood that as used herein, the terms "comprise", "include" and/or "made of . . . " specify the presence of stated features, integers, steps, operations, elements, and/or components, but do not preclude the presence or addition of one or more other features, integers, steps, operations, elements, components, and/or combinations thereof.

The implementations described herein may be described with reference to plan and/or sectional views in idealized representations of the present disclosure. Accordingly, the example illustrations may be modified in accordance with manufacturing techniques and/or tolerances. Accordingly, the implementations are not limited to the implementations shown in the drawings, but include modifications of configurations formed based on manufacturing processes. Thus, the regions illustrated in the figures have schematic properties, and the shapes of the regions shown in the figures illustrate specific shapes of regions of elements, but are not intended to be limiting.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

Current video quality assessment methods in the industry are divided into two categories: subjective video quality assessment and objective video quality assessment. The subjective method directly enables observers to visually judge the video quality, which is relatively accurate but complex, and the result tends to be influenced by various factors and thus cannot be directly applied to the industrial field. Therefore, it is common practice to use an artificial intelligence based objective method that is easy to implement. However, none of the current schemes based on such technologies, such as peak signal to noise ratio (PSNR), structural similarity index measurement (SSIM), video multi-method assessment fusion (VMAF), and the like, can obtain a good enough final result. Therefore, how to assess the video quality more accurately is still an urgent problem to be solved.

At present, the commonly used video quality assessment schemes, such as PSNR, SSIM, VMAF and the like, have the problems of incomplete feature extraction, ambiguous boundary distinction and the like, resulting in a final effect that is not good enough. The present disclosure proposes to preset an initial video quality assessment model for complete feature extraction and accurate detection of boundaries in an image, and acquire reference video data and distorted video data which, together with mean opinion scores (MOSs) thereof, are then used for training the initial video quality assessment model, to obtain a final video quality assessment model, thereby improving the accuracy of video quality assessment.

As shown in FIG. 1, the present disclosure provides a model training method for video quality assessment, which may include the following operations S11 to S13.

At operation S11, training video data is acquired, where the training video data includes reference video data and distorted video data.

At operation S12, an MOS of each piece of training video data is determined.

At operation S13, a preset initial video quality assessment model is trained according to the training video data and the MOS thereof, until a convergence condition is met, so as to obtain a final video quality assessment model.

The reference video data may be regarded as standard video data, and the reference video data and the distorted video data may be obtained by open source datasets LIVE, CSIQ, IVP, and a self-made dataset CENTER. The MOS is a value that indicates high or low quality of the video data. The video data in the open source datasets LIVE, CSIQ, and IVP usually carries the corresponding MOS, but the video data in the self-made dataset CENTER typically does not carry the corresponding MOS. Therefore, the MOS of each piece of training video data needs to be determined, including directly acquiring the MOS from the training video data in the open source dataset LIVE, CSIQ, and IVP, and generating the corresponding MOS for the training video data in the self-made dataset CENTER, or, apparently, directly generating the corresponding MOSs for all the training video data. In the process of training the initial video quality assessment model, when the convergence condition is met, the model can be considered to meet the video quality assessment requirement, so that the training is stopped, and the final video quality assessment model is obtained.

As can be seen from the above operations S11 to S13, according to the model training method for video quality assessment of the present disclosure, an initial video quality assessment model is preset for complete feature extraction of an image and for accurate detection of boundaries in the image, and training video data including reference video data and distorted video data is acquired, while the initial video quality assessment model is trained with the reference video data and the distorted video data to obtain a final video quality assessment model. Therefore, the distorted video data and the non-distorted video data, that is, the reference video data, can be clearly distinguished, thereby ensuring independence and diversity of the video data used for training the model. The final video quality assessment model obtained by training the initial video quality assessment model can enable complete feature extraction of an image and accurate detection of boundaries in the image, and can be directly used for quality assessment of the video data to be assessed, thereby improving the accuracy of video quality assessment.

Generally, in the case of a determined network architecture, two parts of contents in the model may affect the final performance of the model, one includes parameters of the model, such as a weight, a bias, and the like; and the other includes hyper-parameters of the model, such as a learning rate, the number of network layers, and the like. If the same training data is used for optimization of the parameters and the hyper-parameters of the model, it may lead to absolute overfitting of the model. Therefore, two independent datasets may be used to optimize the parameters and the hyper-parameters of the initial video quality assessment model, respectively.

Figure 2:
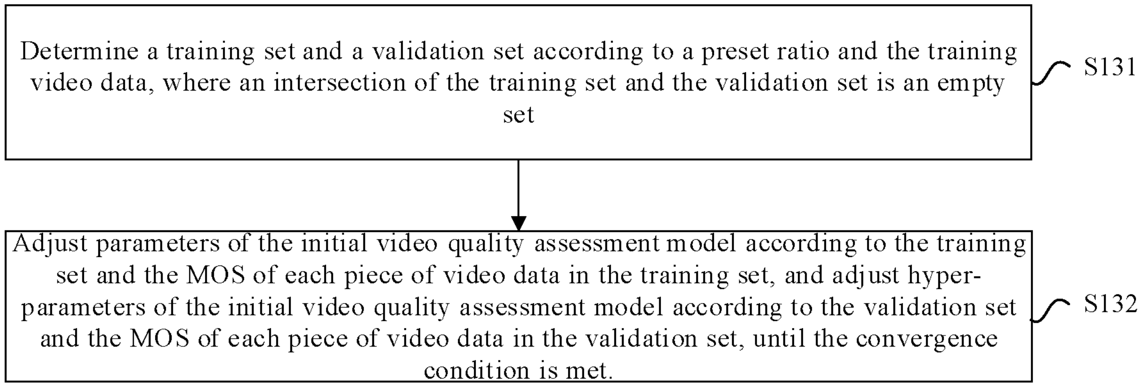
FIG. 2 is a schematic flowchart of training an initial video quality assessment model according to the present disclosure.

Accordingly, as shown in FIG. 2, in some implementations, training the preset initial video quality assessment model according to the training video data and the MOS thereof until the convergence condition is met (that is, operation S13) may include the following operations S131 and S132.

At operation S131, a training set and a validation set are determined according to a preset ratio and the training video data, where an intersection of the training set and the validation set is an empty set.

At operation S132, parameters of the initial video quality assessment model are adjusted according to the training set and the MOS of each piece of video data in the training set, and hyper-parameters of the initial video quality assessment model are adjusted according to the validation set and the MOS of each piece of video data in the validation set, until the convergence condition is met.

The preset ratio is not particularly limited in the present disclosure, and for example, the training data may be divided into a training set and a validation set by a ratio of 6:4. Apparently, the preset ratio may be 8:2, 5:5, or any other ratio. For simple assessment of a generalization capability of the final video quality assessment model, the training video data may be determined as a training set, a validation set, and a test set. For example, the training video data may be divided into a training set, a validation set and a test set by a ratio of 6:2:2, and an intersection between any two of the training set, the validation set, and the test set is an empty set. After the division, the training set and the validation set are used for training the initial video quality assessment model to obtain a final video quality assessment model, and the test set is used for assessing a generalization capability of the final video quality assessment model. It should be noted that more data in the test set leads to longer time spent for assessing the generalization capability of the final video quality assessment model with the test set; and more video data used in training of the initial video quality assessment model leads to higher accuracy of the final video quality assessment model. To further improve the efficiency and accuracy of the video quality assessment, the amount of training video data, and proportions of the training set and the validation set in the training video data, may be increased appropriately. For example, the training video data may be divided into the training set, the validation set, and the test set by another ratio such as 10:1:1.

As can be seen from the above operations S131 to S132, according to the model training method for video quality assessment of the present disclosure, a training set and a validation set, which have an intersection being an empty set, are determined according to a preset ratio and the training video data, parameters of the initial video quality assessment model are adjusted according to the training set and the MOS of each piece of video data in the training set, and hyper-parameters of the initial video quality assessment model are adjusted according to the validation set and the MOS of each piece of video data in the validation set, and when the convergence condition is met, a final video quality assessment model that can implement complete feature extraction of an image and accurate detection of boundaries in the image is obtained, thereby improving the accuracy of video quality assessment.

The process of training the preset initial video quality assessment model according to the training video data and the MOS thereof is a model training process based on deep learning, equivalent to a process of constantly approximating the output of the model to the MOS taking the MOS of the training video data as a reference. When a small difference between the assessment result output from the model and the MOS is reached, the model can be considered to meet the requirement of video quality assessment.

Accordingly, the convergence condition includes that an assessment error rate of any piece of video data in the training set and the validation set does not exceed a preset threshold, and the assessment error rate is calculated by:

$$E = (|S - Mos|)/Mos,$$

where

- E is an assessment error rate of current video data;
- S is an assessment score of the current video data output from the initial video quality assessment model after the adjustment of the parameters and hyper-parameters; and
- Mos is the MOS of the current video data.

For any piece of video data, the MOS of the current video data is determined in advance, and after the current video data is input to the initial video quality assessment model that has subjected to the adjustment of the parameters and hyper-parameters, the assessment score S of the current video data will be output from the initial quality assessment model after the adjustment of the parameters and hyper-parameters, so that an assessment error rate E of the current video data is calculated. If the assessment error rate of any piece of video data in the training set and the validation set does not exceed the preset threshold, it indicates that the difference between the assessment result output from the model and the MOS is small, and the model has met the requirement of video quality assessment, so the training can be stopped then. It should be noted that the preset threshold is not particularly limited in the present disclosure, and for example, the preset threshold may be 0.28, 0.26, 0.24, or the like.

At present, the commonly used video quality assessment schemes, such as PSNR, SSIM, VMAF and the like, also have the problem of motion information loss, resulting in a final effect that is not good enough. The preset initial video quality assessment model according to the present disclosure may include a three-dimensional convolutional neural network for extracting motion information, so as to improve the accuracy of video quality assessment. Accordingly, in some implementations, the initial video quality assessment model includes a three-dimensional convolutional neural network for extracting motion information of an image frame.

Figure 3:
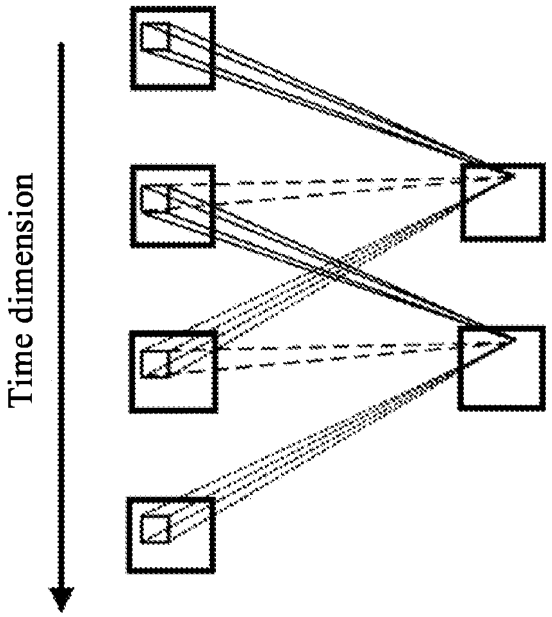
FIG. 3 is a schematic diagram of a three-dimensional convolutional neural network according to the present disclosure.

FIG. 3 shows a schematic diagram of a three-dimensional convolutional neural network according to the present disclosure. The three-dimensional convolutional neural network may stack a plurality of consecutive image frames into a cube, and then apply a three-dimensional convolutional kernel in the cube. In the structure of the three-dimensional convolutional neural network, each feature map in the convolutional layer (as shown in the right half of FIG. 3) is connected to a plurality of adjacent consecutive frames in a preceding layer (as shown in the left half of FIG. 3), so that motion information between the consecutive image frames can be captured.

It is hard to perform complete assessment on the video data with merely the motion information of the image frames extracted by the three-dimensional convolutional neural network. Accordingly, in some implementations, the initial video quality assessment model may further include an attention model, a data fusion processing module, a global pooling module, and a fully-connected layer, where the attention model, the data fusion processing module, the three-dimensional convolutional neural network, the global pooling module, and the fully-connected layer are cascaded in sequence.

In some implementations, the attention model includes a multi-input network, a two-dimensional convolution module, a dense convolutional network, a downsampling processing module, a hierarchical convolutional network, an upsampling processing module, and an attention mechanism network in cascade. The dense convolutional network includes at least two cascaded dense convolution modules each including four cascaded densely connected convolutional layers.

Figure 4:
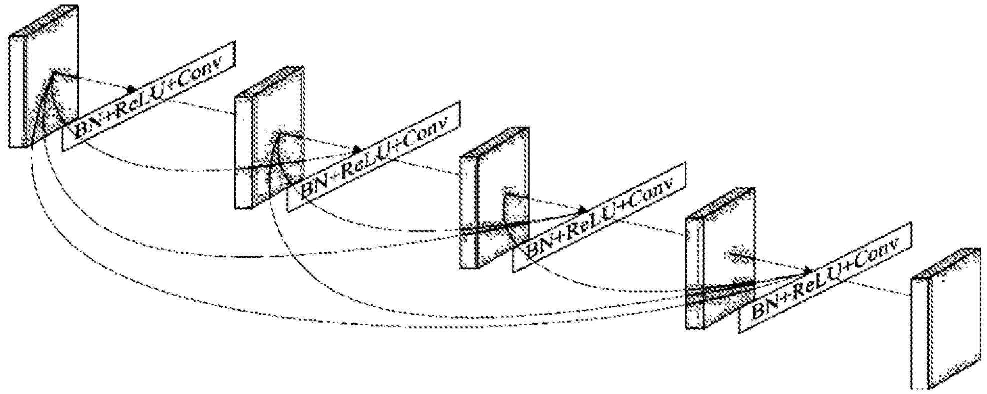
FIG. 4 is a schematic flowchart of a dense convolutional network according to the present disclosure.

FIG. 4 shows a schematic diagram of a dense convolutional network according to the present disclosure. The dense convolutional network includes at least two cascaded dense convolution modules each including four cascaded densely connected convolutional layers, and the input of each densely connected convolutional layer is fusion of feature maps of all preceding densely connected convolutional layers with respect to a current dense convolution module. Each layer of pooled feature map in the encoder will pass through a dense convolution module, and a batch normalization (BN) operation, a rectified linear unit (ReLU) activation function operation and a convolution (Conv) operation are performed each time a dense convolution module is passed through.

In some implementations, the attention mechanism network includes an attention convolution module, a rectified linear unit activation module, a nonlinear activation module, and an attention upsampling processing module in cascade.

Figure 5:
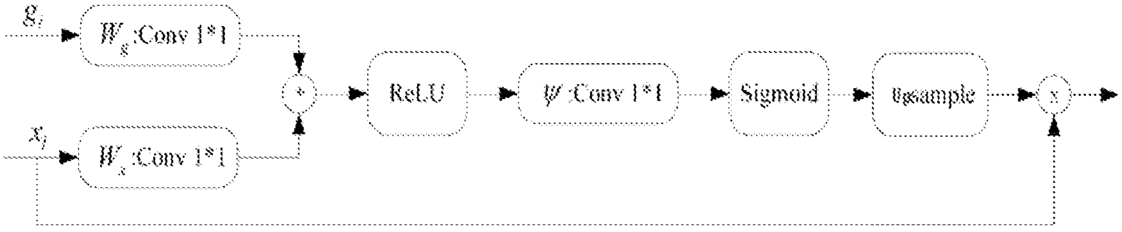
FIG. 5 is a schematic flowchart of an attention mechanism network according to the present disclosure.

FIG. 5 shows a schematic flowchart of an attention mechanism network according to the present disclosure. The input of the attention mechanism network include a low-dimensional feature $g_i$ and a high-dimensional feature $x_l$, where $x_l$ is obtained by upsampling an output xi of the hierarchical convolutional network by 2 times; one part of the output of the dense convolutional network is processed by the upsampling processing module and then input to the hierarchical convolutional network to output xi; $g_i$ is the other part of the output of the dense convolutional network; $g_i$ is subjected to 1*1 convolution ($W_g$: Conv 1*1), $x_l$ is subjected to 1*1 convolution ($W_x$: Conv 1*1), and then the two convolutional results are subjected to matrix addition, and then subjected to processing by the rectified linear unit activation module (ReLU), 1*1 convolution (ψ: Conv 1*1), nonlinear activation (Sigmoid), and upsampling (Upsample), or the like to obtain a linear attention coefficient $$q_{attn}^{l};$$

and finally, the linear attention coefficient $$q_{attn}^{l}$$

is subjected to matrix multiplication with the low-dimensional feature $g_i$ according to elements, while related activation is kept, to obtain an attention coefficient $$\alpha_i^l.$$

The linear attention coefficient $$q_{attn}^{l}$$

may be calculated by:

$$q_{attn}^{l} = \psi^T\left(W_x^T x_i^l + W_g^T x_g^l\right); \quad (1)$$

and the attention coefficient $$\alpha_i^l$$

may be calculated by:

$$\alpha_i^l = \left(q_{attn}^{l}\left(x_i^l, g_i\right)\right). \quad (2)$$

In the equations (1) and (2), $W_g$ is a result obtained by performing 1*1 convolution on $g_i$, $W_x$ is a result obtained by performing 1*1 convolution on $x_l$, T is a matrix transposed symbol, ψ is a result obtained by performing 1*1 convolution on the output of the rectified linear unit activation module, and $$x_i^l \text{ and } x_g^l$$

are both obtained when the rectified linear unit is activated.

In some implementations, the hierarchical convolutional network includes a first hierarchical network, a second hierarchical network, a third hierarchical network, and a fourth upsampling processing module. The first hierarchical network includes a first downsampling processing module and a first hierarchical convolution module in cascade. The second hierarchical network includes a second downsampling processing module, a second hierarchical convolution module, and a second upsampling processing module in cascade. The third hierarchical network includes a global pooling module, a third hierarchical convolution module, and a third upsampling processing module in cascade. The first hierarchical convolution module is further cascaded to the second downsampling processing module, the first hierarchical convolution module and the second upsampling processing module are cascaded to the fourth upsampling processing module, and the fourth upsampling processing module and the third upsampling processing module are further cascaded to the third hierarchical convolution module.

The first downsampling processing module and the second downsampling processing module are both configured to downsample the data. The second upsampling processing module, the third upsampling processing module, and the fourth upsampling processing module are all configured to upsample the data.

Figure 6:
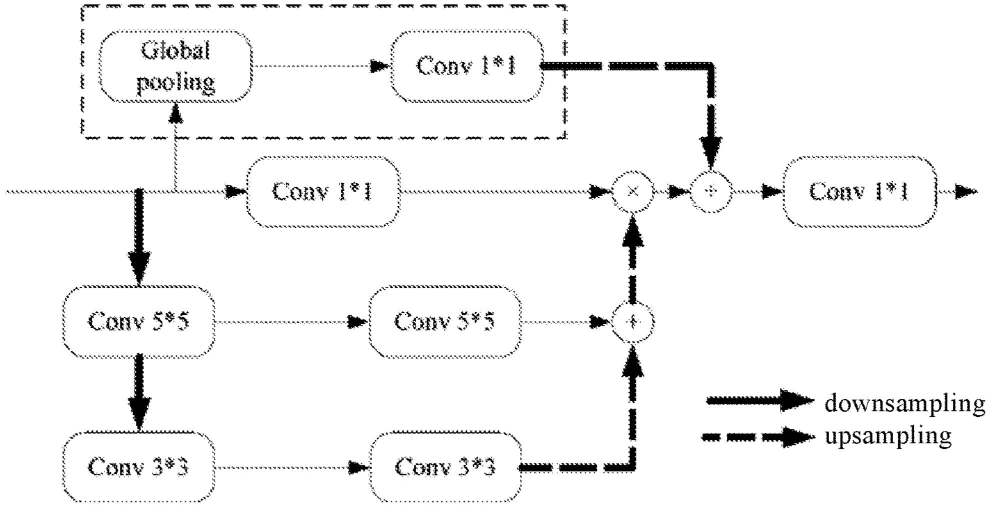
FIG. 6 is a schematic flowchart of a hierarchical convolutional network according to the present disclosure.

FIG. 6 shows a schematic flowchart of a hierarchical convolutional network according to the present disclosure is shown. After data is input to the hierarchical convolutional network, the data are respectively input to the first hierarchical network, the second hierarchical network, the third hierarchical network, and the fourth upsampling processing module for processing. The output of the first hierarchical network and the output of the second hierarchical network are subjected to data fusion, and then input to the fourth upsampling processing module. After input to the hierarchical convolutional network, the data is input to the global pooling module for processing, and then to the third hierarchical convolution module for processing, and the output $X_1$ of the third hierarchical convolution module and the output P(X) of the fourth upsampling processing module are subjected to matrix multiplication to obtain $X_1 \otimes P(X)$, which $X_1 \otimes P(X)$ is then subjected to matrix addition with the output $X_2$ of the third upsampling processing module to obtain $Y=X_2 \oplus (X_1 \otimes P(X))$, which is input to the third hierarchical convolution module again for processing, to obtain an output result of the hierarchical convolutional network, i.e., a high-dimensional feature xi.

In some implementations, the first hierarchical convolution module may perform Conv 5*5 (i.e., 5*5 convolution) on the data, the second hierarchical convolution module may perform Conv 3*3 (i.e., 3*3 convolution) on the data, and the third hierarchical convolution module may perform Conv 1*1 (i.e., 1*1 convolution) on the data. It should be understood that the Conv 5*5, the Conv 3*3 and the Conv 1*1 may be performed by the same convolution module, respectively.

Figure 7:
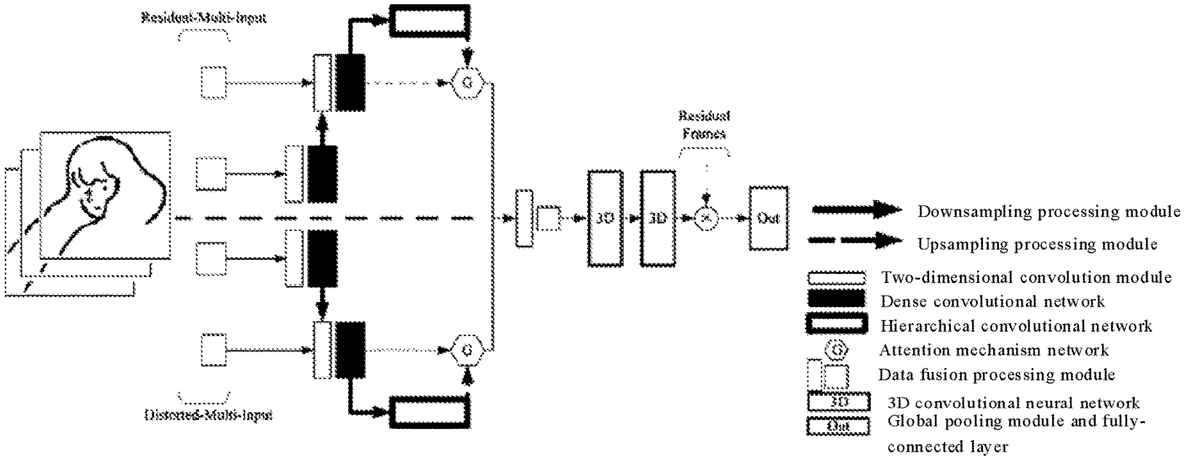
FIG. 7 is a schematic flowchart of an initial video quality assessment model according to the present disclosure.

FIG. 7 shows a schematic flowchart of an initial video quality assessment model according to the present disclosure is shown. The initial video quality assessment model may include a multi-input network, a two-dimensional convolution module, a dense convolutional network, a downsampling processing module, a hierarchical convolutional network, an upsampling processing module, an attention mechanism network, a data fusion processing module, a three-dimensional convolutional neural network, a global pooling module, and a fully-connected layer.

The video quality assessment model of the present disclosure may be referred to as a 3D-PVQA (3 dimensions pyramid video quality assessment) model or a 3D-PVQA method. In the operation S132, the video data in the training set and the video data in the validation set are both divided into distorted video data and residual video data, which are input to the 3D-PVQA model, respectively, that is, residual-multi-input and distorted-multi-input. The residual video data may be obtained by processing with a residual frame according to the distorted video data and the reference video data. The multi-input network outputs the input data as two groups of data, including a first group of original input data, and a second group of data obtained by reducing the original input data by one time according to the size of data frame.

Taking the distorted-multi-input at a lower half as an example, the multi-input network outputs two groups of data. A first group of data is processed by the two-dimensional convolution module, and then input to the dense convolutional network for processing, and then input to the downsampling processing module for processing; while a second group of data is processed by the two-dimensional convolution module and subjected to concat with the output of the downsampling processing module, and input to the dense convolutional network again for processing, where one part of the output of the dense convolutional network is input to the downsampling processing module again for processing, and the output of the downsampling processing module is input to the hierarchical convolutional network for processing. The output of the hierarchical convolutional network is input to the attention mechanism network for processing along with the other part of the output of the dense convolutional network. The data fusion processing module performs data fusion on an output result of the residual video data and an output result of distorted video data obtained after being processed by the attention mechanism network. The output of the data fusion processing module is input to two three-dimensional convolutional neural networks that output a threshold of frame loss perceptibility, the threshold of the frame loss perceptibility and the residual data frame obtained by the residual frame are subjected to matrix multiplication, and finally input to the global pooling module and the fully-connected layer for processing, and then, a quality assessment score of the video data is output.

It should be understood that the same module may be reused, and that although FIG. 6 shows two first hierarchical convolution modules, two second hierarchical convolution modules, and three third hierarchical convolution modules, it does not mean that the hierarchical convolutional network includes two first hierarchical convolution modules, two second hierarchical convolution modules, and three third hierarchical convolution modules in total. The downsampling processing module and the downsampling processing module in the hierarchical convolutional network may be the same module, or may be different modules, and the upsampling processing module, the upsampling processing module in the hierarchical convolutional network, and the attention upsampling processing module in the attention mechanism network may be the same module, or may be different modules.

Figure 8A:
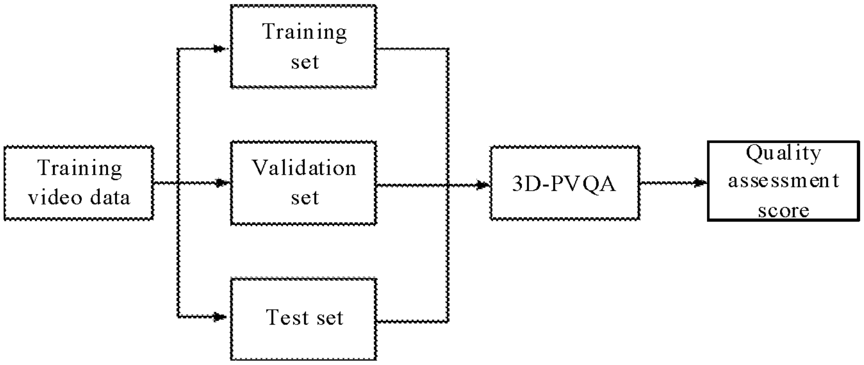
FIG. 8*a* is a schematic diagram of a 3D-PVQA method according to the present disclosure.
Figure 8B:
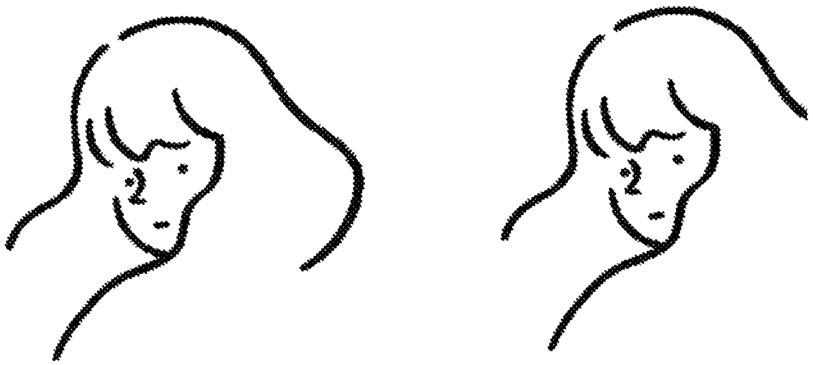
FIG. 8*b* is a diagram illustrating a screenshot of reference video data and a screenshot of distorted video data according to the present disclosure.

FIG. 8*a* shows the training video data may be divided into a training set, a validation set and a test set according to a preset ratio. The training set is input to a 3D-PVQA model for training, the validation set is input to the 3D-PVQA model for validation, and the test set is input to the 3D-PVQA model for testing, so that corresponding quality assessment scores can be obtained. As discussed above, the test set may be used for assessing a generalization capability of the final video quality assessment model. As shown in FIG. 8*b*, the left is a screenshot of the reference video data, and the right is a screenshot of the distorted video data. In Table I below, MOSs of the video data and quality assessment scores corresponding to the video data output from the 3D-PVQA model are shown.

TABLE 1

| Video data ID | Distortion type | MOS | 3D-PVQA |
|---|---|---|---|
| Basketball_ref.yuv | | 100 | 98.670 |
| Basketball_dst_01.yuv | H.264/AVC standard | 78.16 | 76.801 |
| Basketball_dst_02.yuv | Packet loss | 56.37 | 60.243 |
| Basketball_dst_03.yuv | White noise | 46.44 | 37.232 |
| Kimono_ref.yuv | | 100 | 95.682 |
| Kimono_dst_01.yuv | Wavelet | 64.91 | 59.512 |
| Kimono_dst_02.yuv | White noise | 41.66 | 33.871 |

TABLE 1-continued

| Video data ID | Distortion type | MOS | 3D-PVQA |
|---|---|---|---|
| Kimono_dst_03.yuv | Packet loss | 66.67 | 49.168 |
| BQ_ref.yuv | | | |
| BQ_dst_01.yuv | HEVC standard | 85.51 | 92.471 |
| BQ_dst_02.yuv | Wavelet | 60.68 | 75.653 |
| BQ_dst_03.yuv | H.264/AVC Standard | 86.07 | 96.548 |

Figure 9:
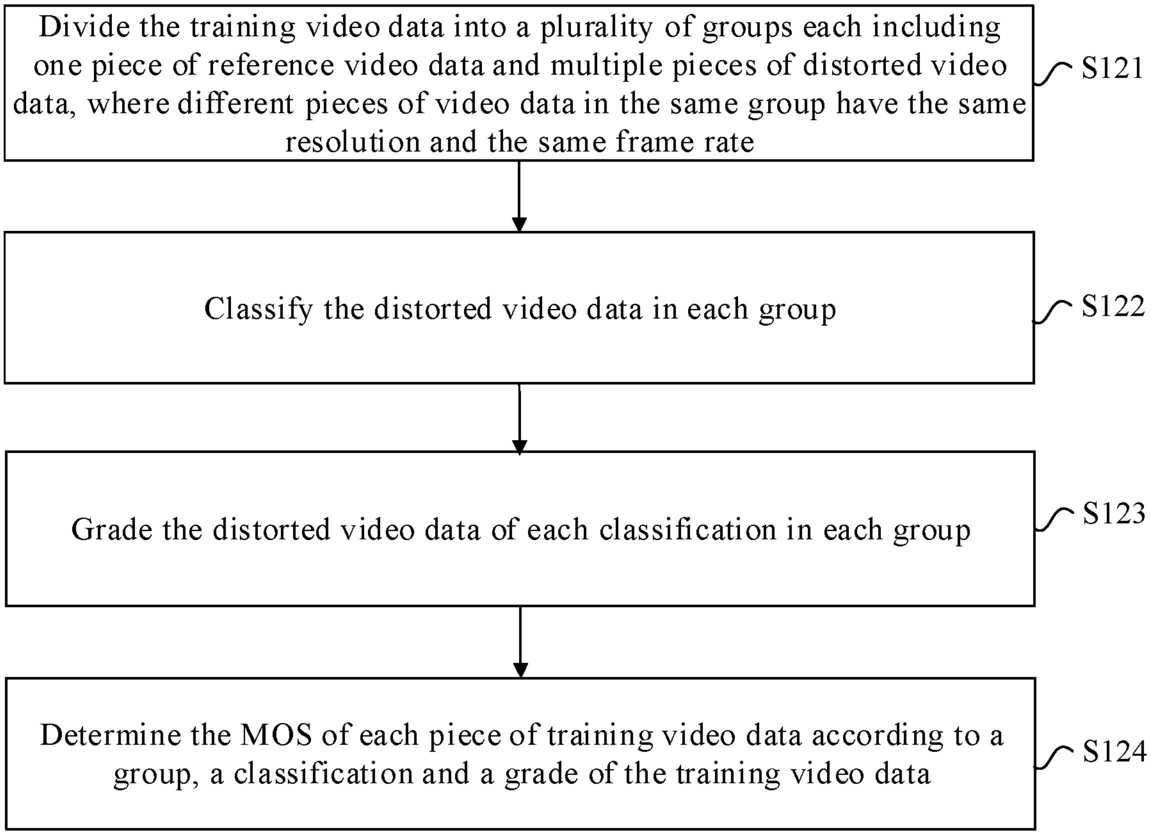
FIG. 9 is a schematic flowchart of determining an MOS of each piece of training video data according to the present disclosure.

As shown in FIG. 9, in some implementations, determining the MOS of each piece of training video data (i.e., operation S12) may include the following operations S121 to S124.

At operation S121, the training video data is divided into a plurality of groups each including one piece of reference video data and multiple pieces of distorted video data, where different pieces of video data in the same group have the same resolution and the same frame rate.

At operation S122, the distorted video data in each group is classified.

At operation S123, the distorted video data of each classification in each group is graded.

At operation S124, the MOS of each piece of training video data is determined according to a group, a classification and a grade of the training video data.

When the distorted video data in each group is classified, the distorted video data may be classified into distorted video data of different categories such as packet loss distortion and coding distortion, and when the distorted video data of each classification in each group is graded, the distorted video data may be classified into three different distortion levels, i.e., light, medium and severe.

After the training video data is grouped, classified and graded, each group includes one piece of reference video data, and multiple pieces of distorted video data belonging to different categories. Each category includes distorted video data belonging to different distortion levels, and the MOS of the training video data may be determined by a subjective assessment method for video quality evaluation (SAMVIQ) method based on the reference video data in each group and the group, the classification and the grade.

Figure 10:
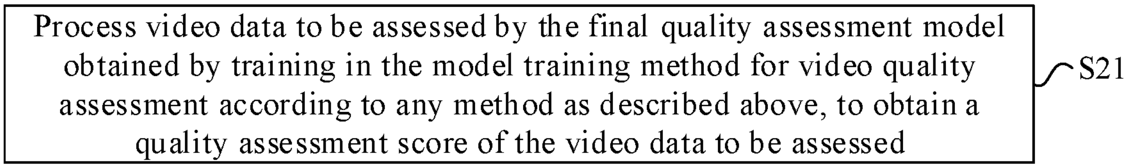
FIG. 10 is a schematic flowchart of a video quality assessment method according to the present disclosure.

As shown in FIG. 10, the present disclosure further provides a video quality assessment method, which may include the following operation S21.

At operation S21, video data to be assessed is processed by the final video quality assessment model obtained by training in the model training method for video quality assessment according to any method as described above, to obtain a quality assessment score of the video data to be assessed.

An initial video quality assessment model is preset for complete feature extraction of an image and for accurate detection of boundaries in the image, and training video data including reference video data and distorted video data is acquired, while the initial video quality assessment model is trained with the reference video data and the distorted video data to obtain a final video quality assessment model. thereby ensuring independence and diversity of the video data used for training the model. The final video quality assessment model can be directly used for quality assessment of the video data to be assessed, thereby improving the accuracy of video quality assessment.

Figure 11:
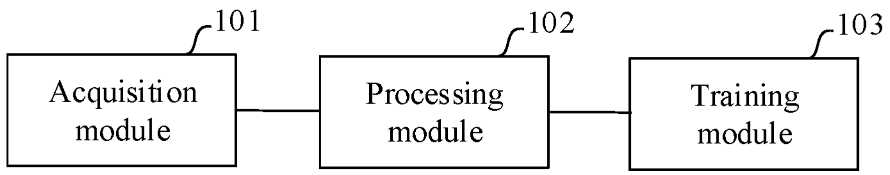
FIG. 11 is a block diagram of a model training apparatus for video quality assessment according to the present disclosure.

Based on the same technical concept, as shown in FIG. 11, the present disclosure further provides a model training apparatus for video quality assessment, which may include: an acquisition module 101, a processing module 102, and a training module 103.

The acquisition module 101 is configured to acquire training video data. The training video data includes reference video data and distorted video data.

The processing module 102 is configured to determine an MOS of each piece of training video data.

The training module 103 is configured to train a preset initial video quality assessment model according to the training video data and the MOS thereof, until a convergence condition is met, so as to obtain a final video quality assessment model.

In some implementations, the training module 103 is configured to determine a training set and a validation set according to a preset ratio and the training video data, where an intersection of the training set and the validation set is an empty set; and adjust parameters of the initial video quality assessment model according to the training set and the MOS of each piece of video data in the training set, and adjust hyper-parameters of the initial video quality assessment model according to the validation set and the MOS of each piece of video data in the validation set, until the convergence condition is met.

In some implementations, the convergence condition includes that an assessment error rate of any piece of video data in the training set and the validation set does not exceed a preset threshold, and the assessment error rate is calculated by:

$$E = (|S - Mos|)/Mos,$$

where

E is an assessment error rate of current video data;

S is an assessment score of the current video data output from the initial video quality assessment model after the adjustment of the parameters and hyper-parameters; and Mos is the MOS of the current video data.

In some implementations, the initial video quality assessment model includes a three-dimensional convolutional neural network for extracting motion information of an image frame.

In some implementations, the initial video quality assessment model further includes an attention model, a data fusion processing module, a global pooling module, and a fully-connected layer, where the attention model, the data fusion processing module, the three-dimensional convolutional neural network, the global pooling module, and the fully-connected layer are cascaded in sequence.

In some implementations, the attention model includes a multi-input network, a two-dimensional convolution module, a dense convolutional network, a downsampling processing module, a hierarchical convolutional network, an upsampling processing module, and an attention mechanism network in cascade, where the dense convolutional network includes at least two cascaded dense convolution modules each including four cascaded densely connected convolutional layers.

In some implementations, the attention mechanism network includes an attention convolution module, a rectified linear unit activation module, a nonlinear activation module, and an attention upsampling processing module in cascade.

In some implementations, the hierarchical convolutional network includes a first hierarchical network, a second hierarchical network, a third hierarchical network, and a fourth upsampling processing module. The first hierarchical network includes a first downsampling processing module and a first hierarchical convolution module in cascade. The second hierarchical network includes a second downsampling processing module, a second hierarchical convolution module, and a second upsampling processing module in cascade. The third hierarchical network includes a global pooling module, a third hierarchical convolution module, and a third upsampling processing module in cascade. The first hierarchical convolution module is further cascaded to the second downsampling processing module, the first hierarchical convolution module and the second upsampling processing module are cascaded to the fourth upsampling processing module, and the fourth upsampling processing module and the third upsampling processing module are further cascaded to the third hierarchical convolution module.

In some implementations, the processing module 102 is configured to: divide the training video data into a plurality of groups each including one piece of reference video data and multiple pieces of distorted video data, where different pieces of video data in the same group have the same resolution and the same frame rate; classify the video data in each group; grade the video data of each classification in each group; and determine the MOS of each piece of training video data according to a group, a classification and a grade of the training video data.

Figure 12:
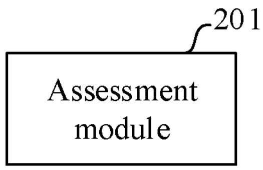
FIG. 12 is a block diagram of a video quality assessment apparatus according to the present disclosure.

Based on the same technical concept, as shown in FIG. 12, the present disclosure further provides a video quality assessment apparatus, including: an assessment module 201 configured to process video data to be assessed by the final video quality assessment model obtained by training in the model training method for video quality assessment according to any method as described above, to obtain a quality assessment score of the video data to be assessed.

Figure 13:
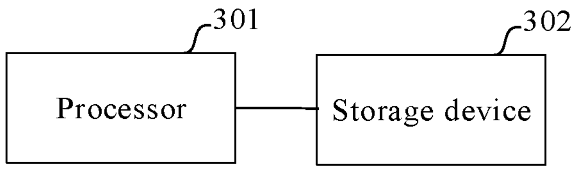
FIG. 13 is a schematic diagram of an electronic device according to the present disclosure.

In addition, as shown in FIG. 13, an implementation of the present disclosure further provides an electronic device, including: one or more processors 301; and a storage device 302 having one or more programs stored thereon which, when executed by the one or more processors 301, cause the one or more processors 301 to perform at least one of: the model training method for video quality assessment described in the foregoing implementations; or the video quality assessment method described in the foregoing implementations.

Figure 14:
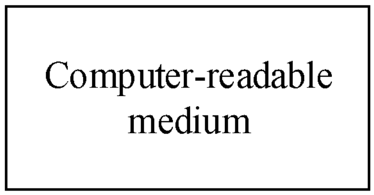
FIG. 14 is a schematic diagram of a computer storage medium according to the present disclosure.

In addition, as shown in FIG. 14, an implementation of the present disclosure further provides a computer storage medium storing a computer program thereon which, when executed by a processor, causes at least one of: the model training method for video quality assessment described in the foregoing implementations; or the video quality assessment method described in the foregoing implementations, to be implemented.

Those of ordinary skill in the art will appreciate that all or some operations of the above described method, functional modules/units in the apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). The term computer storage medium includes volatile and nonvolatile, removable and non-removable media implemented in any method or technology for storage of information such as computer-readable instructions, data structures, program modules or other data, as is well known to those of ordinary skill in the art. The computer storage medium includes, but is not limited to, an RAM, an ROM, an EEPROM, a flash or any other memory technology, a CD-ROM, a digital versatile disc (DVD) or any other optical disc storage, a magnetic cartridge, a magnetic tape, a magnetic disk storage or any other magnetic storage device, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary implementations, and although specific terms are employed, they are used and should be interpreted in a generic and descriptive sense only and not for purposes of limitation. In some instances, as would be apparent to one skilled in the art, features, characteristics and/or elements described in connection with a particular implementation may be used alone or in combination with features, characteristics and/or elements described in connection with another implementation, unless expressly stated otherwise. It will, therefore, be understood by those skilled in the art that various changes in form and details may be made therein without departing from the scope of the present disclosure as set forth in the appended claims.

What is claimed is:

1. A model training method for video quality assessment, comprising:

acquiring training video data, wherein the training video data comprises reference video data and distorted video data;

determining a mean opinion score (MOS) of each piece of training video data; and training a preset initial video quality assessment model according to the training video data and the MOS of the training video data, until a convergence condition is met, so as to obtain a final video quality assessment model, wherein the initial video quality assessment model comprises a three-dimensional convolutional neural network for extracting motion information of an image frame, an attention model, a data fusion processing module, a global pooling module, and a fully-connected layer, wherein the attention model, the data fusion processing module, the three-dimensional convolutional neural network, the global pooling module, and the fully-connected layer are cascaded in sequence, and wherein the attention model comprises a multi-input network, a two-dimensional convolution module, a dense convolutional network, a downsampling processing module, a hierarchical convolutional network, an upsampling processing module, and an attention mechanism network in cascade, wherein the dense convolutional network comprises at least two cascaded dense convolution modules each comprising four cascaded densely connected convolutional layers.

2. The method according to claim 1, wherein training the preset initial video quality assessment model according to the training video data and the MOS of the training video data until the convergence condition is met comprises:

determining a training set and a validation set according to a preset ratio and the training video data, wherein an intersection of the training set and the validation set is an empty set; and adjusting parameters of the initial video quality assessment model according to the training set and the MOS of each piece of video data in the training set, and adjusting hyper-parameters of the initial video quality assessment model according to the validation set and the MOS of each piece of video data in the validation set, until the convergence condition is met.

3. The method according to claim 2, wherein the convergence condition comprises that an assessment error rate of any piece of video data in the training set and the validation set does not exceed a preset threshold, and the assessment error rate is calculated by:

$$E = (|S - Mos|)/Mos,$$

E is the assessment error rate of a current video data;

S is an assessment score of the current video data output from the initial video quality assessment model after the adjustment of the parameters and hyper-parameters; and Mos is the MOS of the current video data.

4. The method according to claim 1, wherein the attention mechanism network comprises an attention convolution module, a rectified linear unit activation module, a nonlinear activation module, and an attention upsampling processing module in cascade.

5. The method according to claim 1, wherein the hierarchical convolutional network comprises a first hierarchical network, a second hierarchical network, a third hierarchical network, and a fourth upsampling processing module, wherein the first hierarchical network comprises a first downsampling processing module and a first hierarchical convolution module in cascade, the second hierarchical network comprises a second downsampling processing module, a second hierarchical convolution module, and a second upsampling processing module in cascade, the third hierarchical network comprises a global pooling module, a third hierarchical convolution module, and a third upsampling processing module in cascade, the first hierarchical convolution module is further cascaded to the second downsampling processing module, the first hierarchical convolution module and the second upsampling processing module are cascaded to the fourth upsampling processing module, and the fourth upsampling processing module and the third upsampling processing module are further cascaded to the third hierarchical convolution module.

6. The method according to claim 1, wherein determining the MOS of each piece of training video data comprises:

dividing the training video data into a plurality of groups each comprising one piece of reference video data and multiple pieces of distorted video data, wherein different pieces of video data in the same group have the same resolution and the same frame rate;

classifying the video data in each group;

grading the video data of each classification in each group; and determining the MOS of each piece of training video data according to a group, a classification and a grade of the training video data.

7. A video quality assessment method, comprising:

processing video data to be assessed by the final video quality assessment model obtained by training in the method according to claim 1, to obtain a quality assessment score of the video data to be assessed.

8. A model training apparatus for video quality assessment, comprising a processor and a storage having instructions stored thereon which, when executed by the processor, cause the processor to:

acquire training video data, wherein the training video data comprises reference video data and distorted video data;

determine a mean opinion score (MOS) of each piece of training video data; and train a preset initial video quality assessment model according to the training video data and the MOS of the training video data, until a convergence condition is met, so as to obtain a final video quality assessment model, wherein the initial video quality assessment model comprises a three-dimensional convolutional neural network for extracting motion information of an image frame, an attention model, a data fusion processing module, a global pooling module, and a fully-connected layer, wherein the attention model, the data fusion processing module, the three-dimensional convolutional neural network, the global pooling module, and the fully-connected layer are cascaded in sequence, and wherein the attention model comprises a multi-input network, a two-dimensional convolution module, a dense convolutional network, a downsampling processing module, a hierarchical convolutional network, an upsampling processing module, and an attention mechanism network in cascade, wherein the dense convolutional network comprises at least two cascaded dense convolution modules each comprising four cascaded densely connected convolutional layers.

9. A video quality assessment apparatus, comprising a processor and a storage having instructions stored thereon which, when executed by the processor, cause the processor to:

process video data to be assessed by the final video quality assessment model obtained by training in the model training method for video quality assessment according to claim 1, to obtain a quality assessment score of the video data to be assessed.

10. An electronic device, comprising:

one or more processors; and a storage device having one or more programs stored thereon which, when executed by the one or more processors, cause the one or more processors to implement: the model training method for video quality assessment according to claim 1.

11. An electronic device, comprising:

one or more processors; and a storage device having one or more programs stored thereon which, when executed by the one or more processors, cause the one or more processors to implement: the video quality assessment method according to claim 7.

12. A non-transitory computer storage medium storing a computer program thereon which, when executed by a processor, causes the processor to implement the model training method for video quality assessment according to claim 1.

13. A non-transitory computer storage medium storing a computer program thereon which, when executed by a processor, causes the processor to implement the video quality assessment method according to claim 7.

14. The method according to claim 2, wherein determining the MOS of each piece of training video data comprises:

dividing the training video data into a plurality of groups each comprising one piece of reference video data and multiple pieces of distorted video data, wherein different pieces of video data in the same group have the same resolution and the same frame rate;

classifying the video data in each group;

grading the video data of each classification in each group; and determining the MOS of each piece of training video data according to a group, a classification and a grade of the training video data.

15. The method according to claim 3, wherein determining the MOS of each piece of training video data comprises:

dividing the training video data into a plurality of groups each comprising one piece of reference video data and multiple pieces of distorted video data, wherein different pieces of video data in the same group have the same resolution and the same frame rate;

classifying the video data in each group;

grading the video data of each classification in each group; and determining the MOS of each piece of training video data according to a group, a classification and a grade of the training video data.

* * * * *